United States Patent
Shotton et al.

(10) Patent No.: US 10,311,282 B2
(45) Date of Patent: Jun. 4, 2019

(54) DEPTH FROM TIME OF FLIGHT CAMERA

(71) Applicant: Microsoft Technology Licensing, LLC, Redmond, WA (US)

(72) Inventors: Jamie Daniel Joseph Shotton, Cambridge (GB); Cem Keskin, Cambridge (GB); Christoph Rhemann, Cambridge (GB); Toby Sharp, Cambridge (GB); Duncan Paul Robertson, Cambridge (GB); Pushmeet Kohli, Cambridge (GB); Andrew William Fitzgibbon, Cambridge (GB); Shahram Izadi, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/701,170

(22) Filed: Sep. 11, 2017

(65) Prior Publication Data
US 2017/0372126 A1    Dec. 28, 2017

Related U.S. Application Data

(63) Continuation of application No. 14/513,746, filed on Oct. 14, 2014, now Pat. No. 9,773,155.

(51) Int. Cl.
*G06T 7/11* (2017.01)
*G01S 17/36* (2006.01)
(Continued)

(52) U.S. Cl.
CPC ........ *G06K 9/00201* (2013.01); *G01S 7/4808* (2013.01); *G01S 7/4911* (2013.01);
(Continued)

(58) Field of Classification Search
CPC ............ G06K 9/6282; G06K 9/00671; G06K 9/00362; G06K 9/002; G01S 17/89;
(Continued)

(56) References Cited

U.S. PATENT DOCUMENTS

| | | | |
|---|---|---|---|
| 7,136,097 | B1 | 11/2006 | Toyoda |
| 7,372,977 | B2 | 5/2008 | Fujimura |

(Continued)

FOREIGN PATENT DOCUMENTS

WO    2014001058    1/2014

OTHER PUBLICATIONS

Schwarz, L. et al. "Estimating Human 3D Pose from Time-of-Flight Images Based on Geodesic Distances and Optical Flow" 2011 IEEE International Conference on Automatic Face & Gesture Recognition and Workshops (FG 2011), pp. 700-706.
(Continued)

*Primary Examiner* — Mia M Thomas

(57) ABSTRACT

Region of interest detection in raw time of flight images is described. For example, a computing device receives at least one raw image captured for a single frame by a time of flight camera. The raw image depicts one or more objects in an environment of the time of flight camera (such as human hands, bodies or any other objects). The raw image is input to a trained region detector and in response one or more regions of interest in the raw image are received. A received region of interest comprises image elements of the raw image which are predicted to depict at least part of one of the objects. A depth computation logic computes depth from the one or more regions of interest of the raw image.

20 Claims, 8 Drawing Sheets

(51) Int. Cl.
*G06K 9/00* (2006.01)
*G01S 17/89* (2006.01)
*G06K 9/62* (2006.01)
*G01S 17/10* (2006.01)
*G01S 7/48* (2006.01)
*G01S 7/491* (2006.01)
*G06T 7/50* (2017.01)

(52) U.S. Cl.
CPC ............ *G01S 17/10* (2013.01); *G01S 17/36* (2013.01); *G01S 17/89* (2013.01); *G06K 9/00362* (2013.01); *G06K 9/00671* (2013.01); *G06K 9/6282* (2013.01); *G06T 7/11* (2017.01); *G06T 7/50* (2017.01); *G06T 2207/10028* (2013.01); *G06T 2207/10048* (2013.01); *G06T 2207/10152* (2013.01); *G06T 2207/20081* (2013.01)

(58) Field of Classification Search
CPC ........ G01S 17/36; G01S 17/10; G01S 7/4911; G01S 7/4808; G06T 7/11; G06T 7/50
See application file for complete search history.

(56) References Cited

U.S. PATENT DOCUMENTS

| | | | |
|---|---|---|---|
| 7,526,120 B2 | 4/2009 | Gokturk | |
| 7,974,443 B2 | 7/2011 | Kipman et al. | |
| 8,432,372 B2 | 4/2013 | Butler et al. | |
| 8,488,888 B2 | 7/2013 | Balan et al. | |
| 8,615,108 B1* | 12/2013 | Stoppa | G06K 9/4671 382/103 |
| 8,693,731 B2 | 4/2014 | Holz et al. | |
| 9,286,657 B1 | 3/2016 | Thorup, Jr. | |
| 9,442,186 B2 | 9/2016 | Payne | |
| 9,773,155 B2 | 9/2017 | Shotton et al. | |
| 2005/0058337 A1 | 3/2005 | Fujimura | |
| 2006/0147108 A1 | 7/2006 | Kee | |
| 2010/0013927 A1 | 1/2010 | Nixon | |
| 2010/0034427 A1 | 2/2010 | Fujimura | |
| 2010/0188932 A1* | 7/2010 | Hanks | G01S 7/52004 367/140 |
| 2010/0226564 A1 | 9/2010 | Marchesotti | |
| 2010/0246673 A1* | 9/2010 | Tanaka | H04N 21/4307 375/240.12 |
| 2010/0278393 A1* | 11/2010 | Snook | G06F 3/011 382/107 |
| 2011/0044506 A1 | 2/2011 | Chen | |
| 2011/0058017 A1 | 3/2011 | Lee | |
| 2011/0205337 A1* | 8/2011 | Ganapathi | G06K 9/00342 348/46 |
| 2011/0206273 A1 | 8/2011 | Plagemann | |
| 2011/0224542 A1 | 9/2011 | Mittal | |
| 2011/0242277 A1 | 10/2011 | Do | |
| 2011/0286676 A1* | 11/2011 | El Dokor | G06F 3/017 382/225 |
| 2012/0027263 A1 | 2/2012 | Liu | |
| 2012/0098935 A1 | 4/2012 | Schmidt | |
| 2012/0105585 A1* | 5/2012 | Masalkar | G06F 3/017 348/46 |
| 2012/0120073 A1 | 5/2012 | Haker | |
| 2012/0162403 A1 | 6/2012 | Bae | |
| 2012/0194644 A1 | 8/2012 | Newcombe | |
| 2012/0212413 A1 | 8/2012 | Plagemann | |
| 2012/0235904 A1 | 9/2012 | Plagemann | |
| 2012/0294504 A1 | 11/2012 | Kyriakou | |
| 2013/0121563 A1 | 5/2013 | Chen | |
| 2013/0156296 A1 | 6/2013 | El Dokor | |
| 2013/0162778 A1 | 6/2013 | Kurokawa | |
| 2013/0236089 A1 | 9/2013 | Litvak | |
| 2013/0278501 A1 | 10/2013 | Bulzacki | |
| 2013/0342671 A1* | 12/2013 | Hummel | G06K 9/6202 348/77 |
| 2014/0099019 A1 | 4/2014 | El Dokor | |
| 2014/0211991 A1* | 7/2014 | Stoppa | G06K 9/00355 382/103 |
| 2014/0219551 A1 | 8/2014 | Tang | |
| 2014/0267243 A1 | 9/2014 | Venkataraman | |
| 2014/0300701 A1 | 10/2014 | Park | |
| 2014/0333728 A1 | 11/2014 | Navab | |
| 2015/0131898 A1 | 5/2015 | Schelten | |
| 2015/0241987 A1* | 8/2015 | Liu | G06F 3/017 345/156 |
| 2015/0248167 A1 | 9/2015 | Turbell | |
| 2016/0014392 A1 | 1/2016 | Liang | |
| 2016/0019458 A1 | 1/2016 | Kaufhold | |
| 2016/0125272 A1 | 5/2016 | Schneiderman | |
| 2017/0116765 A1 | 4/2017 | Chamaret | |

OTHER PUBLICATIONS

"3 Gear Systems Inc", Aug. 19, 2014, Available at: http://threegear.com.

Athitsos, et al., "Estimating 3D hand pose from a cluttered image", In Proceedings of IEEE Computer Society Conference on Computer Vision and Pattern Recognition, Jun. 16, 2003, 8 pages.

Ballan, et al., "Motion Capture of Hands in Action using Discriminative Salient Points", In Proceedings of 12th European Conference on Computer Vision, Oct. 7, 2012, 14 pages.

Bray, et al., "Smart Particle Filtering for 3D Hand Tracking", In Proceedings of the Sixth IEEE International Conference on Automatic Face and Gesture Recognition, May 17, 2004, 6 pages.

Criminisi, et al., "Decision Forests for Computer Vision and Medical Image Analysis", In Springer, Feb. 7, 2013, 2 pages.

Darn, et al., "Quaternions, Interpolation and Animation", In Technical Report DIKU-TR-98/5, University of Copenhagen, Jul. 17, 1998, 103 pages.

Goree, et al., "Model-based 3D Hand Pose Estimation from Monocular Video", In IEEE Transactions on Pattern Analysis and Machine Intelligence, vol. 33, Issue: 9, Sep. 2011, 14 pages.

Dipietro, et al., "A Survey of Glove-Based Systems and their Applications", In IEEE Transactions on Systems, Man, and Cybernetics, Part C: Applications and Reviews, vol. 38, Issue 4, Jul. 2008, 22 pages.

Erol, et al., "Vision-based Hand Pose Estimation: A review", In Proceedings of Computer Vision and Image Understanding 108, Oct. 2007, 22 pages.

Gall, et al., "Hough Forests for Object Detection, Tracking, and Action Recognition", In IEEE Transactions on Pattern Analysis and Machine Intelligence, vol. 33, No. 11, Nov. 2011, 15 pages.

Girshick, et al., "Efficient Regression of General-Activity Human Poses from Depth Images", In Proceedings of the International Conference on Computer Vision, Nov. 6, 2011, 8 pages.

Heap, et al., "Towards 3D Hand Tracking using a Deformable Model", In Proceedings of the Second International Conference on Automatic Face and Gesture Recognition, Oct. 14, 1996, 6 pages.

Juang, Chia-Feng, "A Hybrid of Genetic Algorithm and Particle Swarm Optimization for Recurrent Network Design", In Proceedings of the IEEE Transactions on Systems, Man, and Cybernetics Part B: Cybernetics, vol. 34, No. 2, Apr. 2004, 10 pages.

Keskin, et al., "Hand Pose Estimation and Hand Shape Classification using Multilayered Randomized Decision Forests", In Proceedings of the 12th European Conference on Computer Vision, Oct. 7, 2012, 4 pages.

Kim, et al., "Digits: Freehand 3D Interactions Anywhere using a Wrist-Worn Gloveless Sensor", In Proceedings of the 25th annual ACM symposium on User interface software and technology, Oct. 7, 2012, 10 pages.

Krupka, et al., "Discriminative Ferns Ensemble for Hand Pose Recognition", In Proceedings of the IEEE Conference on Computer Vision and Pattern Recognition, Jun. 23, 2014, 8 pages.

"Leap Motion Inc", Aug. 20, 2014, Available at: http://leapmotion.com/product.

Melax, et al., "Dynamics Based 3D Skeletal Hand Tracking", In Proceedings of Graphics Interface, May 29, 2013, 8 pages.

(56) References Cited

OTHER PUBLICATIONS

Oikonomidis, et al., "Efficient Model-Based 3D Tracking of Hand Articulations using Kinect", In Proceedings of British Machine Vision Conference, Aug. 29, 2011, 11 pages.
Oikonomidis, et al., "Full DOF Tracking of a Hand Interacting with an Object by Modeling Occlusions and Physical Constraints", In Proceedings of Computer Vision, Nov. 6, 2011, 8 pages.
Oikonomidis, et al., "Tracking the Articulated Motion of Two Strongly Interacting Hands", In Proceedings IEEE Conference on the Computer Vision and Pattern Recognition, Jun. 16, 2012, 8 pages.
Oikonomidis, et al., "Evolutionary Quasi Random Search for Hand Articulations Tracking", In Proceedings of the IEEE Conference on Computer Vision and Pattern Recognition, Jun. 23, 2014, 8 pages.
Qian, et al., "Realtime and Robust Hand Tracking from Depth", In Proceedings of Computer Vision and Pattern Recognition, Jun. 2014, 8 pages.
Shotton, et al., "Real-Time Human Pose Recognition in Parts from a Single Depth Image", In Proceedings of Computer Vision and Pattern Recognition, Jun. 2011, 8 pages.
Shotton, et al., "Decision Jungles: Compact and Rich Models for Classification", In Proceedings of Advances in Neural Information Processing Systems, Dec. 5, 2013, 9 pages.
Sridhar, et al., "Interactive Markerless Articulated Hand Motion Tracking using RGB and Depth Data", In Proceedings of IEEE International Conference on Computer Vision, Dec. 3, 2013, 8 pages.
Stenger, et al., "Model-Based 3D Tracking of an Articulated Hand", In Proceedings of IEEE Computer Society Conference on Computer Vision and Pattern Recognition, Dec. 8, 2001, 16 pages.
Sun, et al., "Conditional Regression Forests for Human Pose Estimation", In Proceedings of IEEE Conference on Computer Vision and Pattern Recognition, Jun. 16, 2012, 8 pages.
Tang, et at, "Real-Time Articulated Hand Pose Estimation using Semi-Supervised Transductive Regression Forests", In Proceedings of IEEE International Conference on Computer Vision, Sep. 30, 2013, 8 pages.
Tang, et al., "Latent Regression Forest: Structured Estimation of 3D Articulated Hand Posture", In Proceedings of IEEE Conference on Computer Vision and Pattern Recognition, Jun. 9, 2014, 8 pages.
Taylor, et al., "The Vitruvian Manifold: Inferring Dense Correspondences for One-Shot Human Pose Estimation", In IEEE Conference on Computer Vision and Pattern Recognition, Jun. 16, 2012, 8 pages.
Taylor, et al., "User-Specific Hand Modeling from Monocular Depth Sequences", In IEEE Conference on Computer Vision and Pattern Recognition, Jun. 24, 2014, 8 pages.
Tompson, et al., "Real-Time Continuous Pose Recovery of Human Hands using Convolutional Networks", In Proceedings of ACM Transactions on Graphics, vol. 33, Issue 4, Jul. 2014, 10 pages.
Wang, et al., "Real-Time Hand-Tracking with a Color Glove", In Proceedings of ACM Transactions on Graphics, vol. 28, No. 3, Jul. 2009, 8 pages.
Wang, et al., "6D Hands: Markerless Hand-Tracking for Computer Aided Design", In Proceedings of the 24th annual ACM symposium on User interface software and technology, Oct. 16, 2011, 9 pages.
Wang, et al., "Video-Based Hand Manipulation Capture through Composite Motion Control", In Proceedings of ACM Transactions on Graphics, vol. 32 Issue 4, Jul. 21, 2013, 14 pages.
Wu, et al., "View-Independent Recognition of Hand Postures", In Proceedings of IEEE Conference on Computer Vision and Pattern Recognition, Jun. 13, 2000, 7 pages.

Wu, et al., "Capturing Natural Hand Articulation", In Proceedings of the 8th International Conference on Computer Vision, vol. 2, Jul. 7, 2001, 7 pages.
Xu, et al., "Efficient Hand Pose Estimation from a Single Depth Image", In Proceedings of the IEEE International Conference on Computer Vision, Dec. 1, 2013, 7 pages.
Yuille, et al., "Vision as Bayesian Inference: Analysis by Synthesis?", In Proceedings of Trends in Cognitive Sciences, vol. 10, No. 7, Jul. 2006, 8 pages.
Zhao, et al., "Combining Markerbased Mocap and RGB-D Camera for Acquiring High-Fidelity Hand Motion Data", In Proceedings of the ACM SIGGRAPH/Eurographics Symposium on Computer Animation, Jul. 29, 2012, 10 pages.
Breuer, et al., "Hand Gesture Recognition with a novel IR Time of-Flight Range Camera-A pilot study", In Proceedings of the $3^{rd}$ international conference on Computer vision/computer graphics collaboration techniques, Mar. 28, 2007, 14 pages.
Prisacariu, et al., "PWP3D: Real-time Segmentation and Tracking of 3D Objects", In International journal of computer vision, vol. 98 Issue 3, Jan. 17, 2012, 23 pages.
Loocke, Martijn, "Creation of a Virtual Pseudo-skeleton Through 3D Imagery Creation of a Virtual Pseudo-skeleton Through 3D Imagery", In Master Thesis, Aug. 18, 2014, 86 pages.
Glynos, Constantinos, "3D Skeleton extraction using one Kinect camera", In Proceedings of Second Symposium on Network Cloud Computing and Applications, Dec. 3, 2012, 79 pages.
Zhu, et al., "Real-Time Hand Gesture Recognition with Kinect for Playing Racing Video Games", In Proceedings of the International Joint Conference on Neural Networks, Jul. 6, 2014, 7 pages.
Breivik, et al., "A Motion based Real-time Foveation Control Loop for Rapid and Relevant 3D Laser Scanning", In IEEE Computer Society Conference on Computer Vision and Pattern Recognition Workshops, Jun. 20, 2011, 8 pages.
Hansard, et al., "Time of Flight Cameras: Principles, Methods, and Applications", retrieved on Jan. 18, 2016 at <<https://hal.inria.fr/hal-00725654/pdf/tot.pdf>>, Springer, 2012, pp. 1-95.
Jain, et al., "Real-Time Upper Body Human Pose Estimation Using a Depth Camera", Computer Vision/Computer Graphics Collaboration Techniques, Springer Berlin Heidelberg, 2011, pp. 227-238.
International Search Report and Written Opinion dated Jan. 27, 2016 for PCT Application No. PCT/US1S/54349, 13 pages.
Reynolds, et al., "Capturing Time-of-Flight Data with Confidence", IEEE Conference on Computer Vision and Pattern (CVPR), 2011, IEEE, pp. 945-952 Recognition.
Shotton, et al., "Real-Time Human Pose Recognition in Parts from Single Depth Images", IEEE Conference on Computer Cision and Pattern Recognition (CVPR), IEEE, 2011, pp. 1297-1304.
"Second Written Opinion Issued in PCT Application No. PCT/US2015/054349," dated Sep. 12, 2016, 5 Pages.
"Final Office Action Issued in U.S. Appl. No. 14/513,746", dated Feb. 8, 2017, 36 Pages.
"Non Final Office Action Issued in U.S. Appl. No. 14/513,746", dated Feb. 16, 2016, 31 Pages.
"Non Final Office Action Issued in U.S. Appl. No. 14/513,746", dated Aug. 16, 2016, 39 Pages.
"Notice of Allowance Issued in U.S. Appl. No. 14/513,746", dated May 23, 2017, 11 Pages.
"Amendment and Response Filed in U.S. Appl. No. 14/513,746", dated Apr. 25, 2017, 19 Pages.
"Amendment and Response Filed in U.S. Appl. No. 14/513,746", dated May 4, 2016, 31 Pages.
"Amendment and Response Filed in U.S. Appl. No. 14/513,746", dated Nov. 15, 20166, 20 Pages.
"Office Action Issued in European Patent Application No. 15784841.7", dated May 22, 2018, 4 pages.

* cited by examiner

DEPTH FROM TIME OF FLIGHT CAMERA

BACKGROUND

Time-of-flight (TOF) cameras are increasingly used in a variety of applications, for example, human computer interaction, automotive applications, measurement applications and machine vision. A TOF camera can be used to generate depth maps which contain information relating to the depth of an object in a scene from the camera. The depth refers to the projection of distance on an imaginary line that extends from the camera, where the distance is the absolute radial distance or the distance from the imaging plane to a surface in the scene. A light source at the TOF camera illuminates the scene and the light is reflected by objects in the scene. The camera receives the reflected light that, dependent on the distance of an object to the camera, experiences a delay. Given the fact that the speed of light is known, a depth map may be generated.

The embodiments described below are not limited to implementations which solve any or all of the disadvantages of known time of flight cameras or time of flight image processing systems.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

Region of interest detection in raw time of flight images is described. For example, a computing device receives at least one raw image captured for a single frame by a time of flight camera. The raw image depicts one or more objects in an environment of the time of flight camera (such as human hands, bodies or any other objects). The raw image is input to a trained region detector and in response one or more regions of interest in the raw image are received. A received region of interest comprises image elements of the raw image which are predicted to depict at least part of one of the objects. A depth computation logic computes depth from the one or more regions of interest of the raw image.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
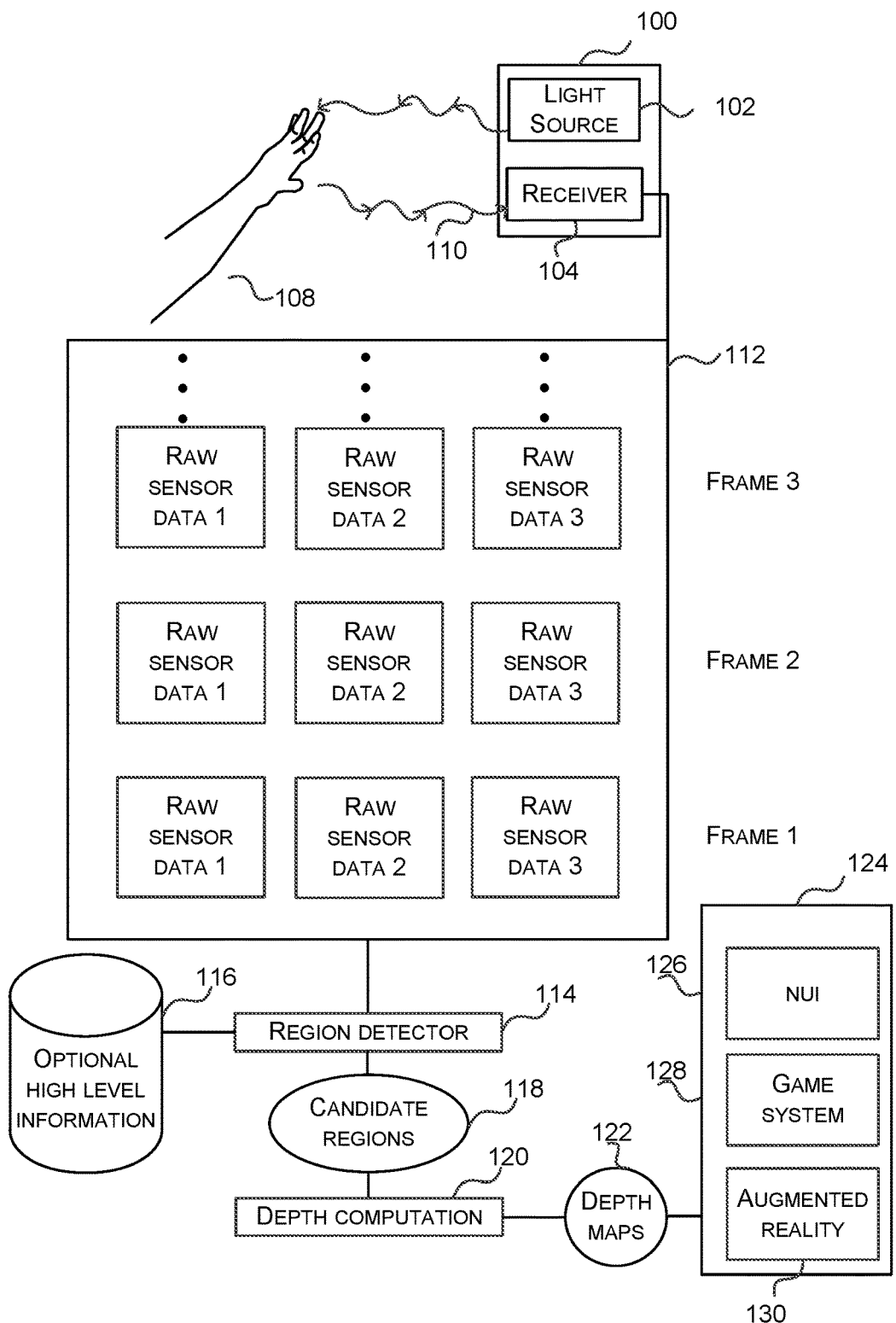
FIG. 1 is a schematic diagram of a time of flight camera capturing raw image data of a user's hand in the environment, and of a region detector and a depth computation component which compute depth maps from the raw image data.

FIG. 1 is a schematic diagram of a time of flight camera 100 capturing raw image data 112 of a user's hand 108 making complex hand poses in the environment, and of a region detector 114 and a depth computation component 120 which compute depth maps 122 from the raw image data. In this example, one hand 108 is shown. However, in practice there may be multiple hands in the scene, from one or more users.

It is recognized herein that computing depth from the raw sensor data 112 is resource intensive in terms of computational resources such as memory and processing capacity, and also in terms of time. The new processing pipeline of FIG. 1 enables computational resources and memory to be allocated in a more efficient manner. The region detector 114 detects regions of interest in the raw image data. A raw image from a time of flight sensor is a plurality of sensor measurements, such as infra-red intensity values. A plurality of raw images, one for each of a plurality of modulation frequencies, may be sensed for a single frame of the time of flight sensor. In the example of FIG. 1, the regions of interest are regions which depict hands, as opposed to background surfaces, forearm and wrist surfaces. However, the regions of interest will depict different objects or parts of objects according to the particular task the time of flight camera is being used for.

In some examples the region detector acts as a segmentor as well as a detector. For example, it distinguishes between regions of the raw image data which depict single hands (or other objects or parts of objects depending on the task involved); that is, the region detector segments regions of the raw image data depicting individual hands. Where two hands are interacting, for example, shaking hands or making a "high five" gesture this is especially difficult. However, in some examples the segmentation is carried out later in the processing pipeline, after depth has been computed.

The output of the region detector 114 is zero, one or more candidate regions 118 of raw sensor data per frame from the time of flight camera. Each frame may comprise a plurality of raw sensor data images as indicated in FIG. 1 and described in more detail below. The regions are input to a depth computation component 120 which computes depth values from the regions of raw sensor data. This enables resources to be allocated more efficiently because depth is only computed for the candidate regions 118 of a frame rather than for the complete raw sensor data of a frame. Previous approaches have computed depth for entire frames of data.

Detecting regions of interest from raw sensor data is not straightforward as the raw sensor data is noisy due to sensor noise, may contain ambient illumination and does not provide scale information.

The region detector 114 of the new processing pipeline has been trained to learn associations between image elements of raw time of flight images and regions of interest. For example the region detector comprises a trained classifier which acts to classify image elements of raw sensor data images, or aggregated raw sensor data images. The results of the classification are then used to compute candidate regions as described in more detail below. In some examples the region detector 114 makes use of high level information 116 such as knowledge of the type of object in the region of interest, state data from a downstream system 124, or regions of interest detected in previous frames. The state data may be the state of a game executing on a game system 128, or the state of an augmented reality system 130 for example. The state data provides an indication of likely or unlikely regions of interest.

The depth maps 122 from the depth computation component are input to a downstream system 124 such as a natural user interface 126, a game system 128 or an augmented reality system 130. These are examples only and other downstream systems 124 may be used. In some examples the depth maps 122 are input to a pose tracker arranged to track high dimensional pose of the user's hand. In some example the depth maps are used for range measurement, automotive applications e.g. parking sensors and collision avoidance systems and other applications where accurate distances to objects are measured.

In the examples shown in FIG. 1 the region detector 114 and the depth computation component 120 are shown outside the time of flight camera 100 for clarity. However, the region detector 114 and the depth computation component 120 may be integral, in whole or in part, with the time of flight camera. This is explained below with reference to FIG. 6. In other examples the region detector 114 and/or the depth computation component are in a computing device (such as that of FIG. 8) that is able to receive data from the time of flight camera, for example using a wired or wireless communication link or in other ways. In some examples the region detector and/or the depth computation component are located at a computing device in the cloud.

The time of flight camera 100 may be a phase modulation time of flight camera or a gated time of flight camera which uses shutter timings. It comprises a light source 102 and a receiver 104.

the case of a phase modulation time of flight camera, the light source 102 emits modulated light. In an example, the source 102 of modulated light may be an incoherent light source which emits transmitted light 106 that is modulated with a signal at a modulation frequency $f_{mod}$. In an example the light from the device may be modulated at a high frequency e.g. a frequency in the MHz range, such that the amount of illumination changes periodically. In an example the periodic change of illumination may take the form of a sinusoid function.

In a phase modulation time of flight example, the source 102 of modulated light emits light at multiple modulation frequencies, for example three modulation frequencies. The light source 102 may be selected so that the wavelength of the emitted light is the most appropriate wavelength for a particular application. In an example the light source may be a non-visible light source e.g. a near infra-red light source. In another example the light source may be a visible light source. In an embodiment the light source may be selected to be a source of light of an appropriate wavelength for the application for which it is intended.

In the case of a gated (also referred to as pulse-based) time of flight camera, the light source 102 emits extremely short pulses of illumination. For example using a powerful laser light source which emits pulses of light of picosecond duration. In the case of gated time of flight camera, the receiver 104 comprises a high speed range sensor with resolution capable of resolving the short pulses of the light source 102. For example, the receiver 104 has picosecond resolution.

The light source may illuminate an object 108 within the field of the camera and at least some of the light is reflected back toward the camera from the object. In an example the detected object may be a person or part of a person as in the example of FIG. 1; however a depth map may be generated of any object or part of an object. The reflected light 110 may be detected by the receiver 104.

Figure 3:
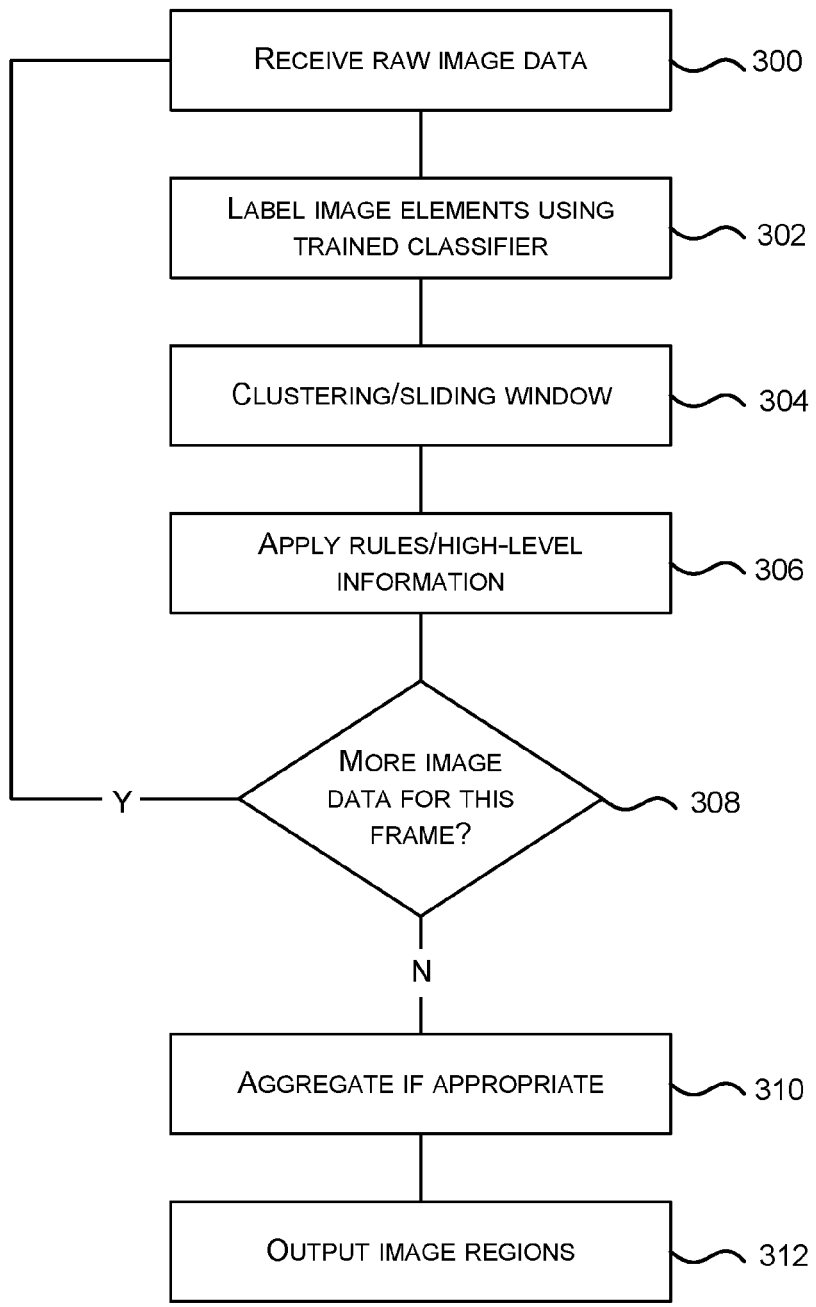
FIG. 3 is a flow diagram of a method at the region detector of FIG. 2.

In phase modulation time of flight, the reflected light is also modulated and the reflected light 110 may be out of phase with the transmitted light 106 due to the delay caused by the distance the light has travelled on the return trip between the camera and the object. For each pixel of the receiver 104 the amplitude and phase difference of the received signal relative to the transmitted light may be determined for each modulation frequency. In the example of FIG. 3 three modulation frequencies are used resulting in three raw sensor data images per frame of the time of flight camera. However, other numbers of modulation frequencies may be used.

In gated time of flight, the amount of reflected light that a pixel of the receiver 104 registers is measured for one or more different exposure periods. An exposure period is a time interval during which pixels of a photosensor of the time of flight camera 100 are actively sensing (as opposed to being "switched off"). The amount of light reflected from a surface in the field of view during the exposure periods is used to calculate distance of a surface from the camera. This may be done by comparing the amount of reflected light sensed with a model of the camera behavior obtained during a calibration process. In some examples, the model is a probabilistic model of camera behavior.

Figure 2:
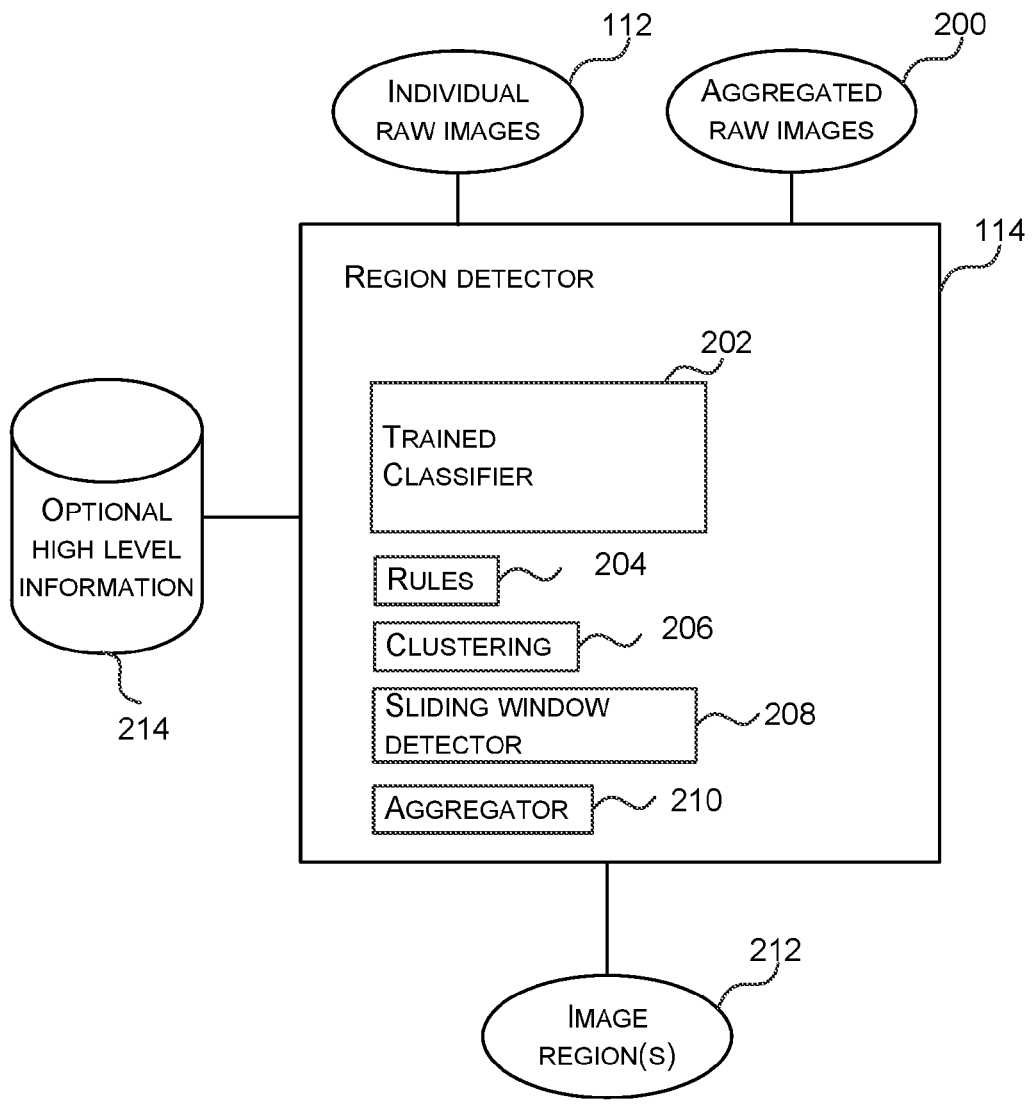
FIG. 2 is a schematic diagram of the region detector of FIG. 1 in more detail.

FIG. 2 is a schematic diagram of a computer-implemented region detector 114 for detecting image regions 212 in raw time of flight image data, where the regions depict a specified type of object or object part. The region detector may be that of FIG. 6 or FIG. 8 for example. In some examples the region detector takes as input individual raw images 112 such as one of the "raw sensor data 1" images of FIG. 1. In other examples the region detector takes as input aggregated raw images 200. For example, an aggregated raw image 200 is an average brightness image which is an aggregation of three infra-red images, one for each of three modulation frequencies (where the time of flight camera uses three modulation frequencies as described above). In some examples the region detector takes as input an ambient raw image, which is an image captured during a period of no active illumination by the time of flight camera and which captures light as a result of any ambient illumination in the scene.

The region detector 114 comprises a trained classifier 202, optional rules 204, a clustering component 206 (in some examples), a sliding window detector 208 (in some examples), and an aggregator 210 in the case that the input is multiple individual raw images 112 per frame. The region detector 114 has access to or is sent high level information 214. Examples of high level information include but are not limited to, a user's hand size, a user's hand shape, a 3D model of an object to be detected.

The trained classifier may be a neural network, a support vector machine, a random decision forest, a jungle of directed acyclic graphs, a discriminative fern ensemble, or any other trained classifier. The training data used to train the classifier comprises a large number of raw time of flight images with labeled regions of interest. The training data comprises raw time of flight images depicting one or more objects or parts of objects of interest in different environments and with different lighting conditions. The training data may be empirically observed or may be synthetically generated.

A random forest comprises a plurality of decision trees each having a root node, a plurality of split nodes and a plurality of leaf nodes. At test time (when a previously unseen example is applied to the already trained random forest) Image elements of an image may be pushed through trees of a random decision forest from the root to a leaf node in a process whereby a decision is made at each split node. The decision is made according to characteristics of the image element and characteristics of test image elements displaced therefrom by spatial offsets specified by the parameters at the split node. At a split node the image element proceeds to the next level of the tree down a branch chosen according to the results of the decision. The random decision forest may use regression or classification. One leaf node from each tree in the forest is reached and data stored at those leaf nodes during training is accessed. For example, this data comprises labeled training data in an aggregated form. The leaf node data found from each tree may be aggregated to produce a final output.

During training, parameter values (also referred to as features) are learnt for use at the split nodes and data is accumulated at the leaf nodes. For example, training data comprising labeled images are passed through the tree and split node test parameters are selected (from randomly generated possibilities) at each split node according to how well the split node test parameters deal with the training data at the split node. An information gain criterion or other well-known criterion may be used to assess how effectively the split node test parameters deal with the training data at the split node.

A decision jungle is a plurality of directed acyclic graphs configured as for a random decision forest, except that a plurality of the split nodes are merged together. That is, rather than being binary trees as in a random decision forest, the individual members of the jungle are directed acyclic graphs.

A discriminative fern ensemble is a plurality of look up tables containing aggregated training data indexed by index values where the aggregated training data (such as image labels in the case of image classification) and index values are learnt during a training phase. At test time the index values are computed from an unseen example, such as an image or a patch of image elements, (without the need to traverse a directed acyclic graph or decision tree) and used to look up aggregated training data from each fern table in the ensemble. The data looked up from each fern table is aggregated to calculate an output prediction, such as a distribution over class labels (in the case of a classification task).

The clustering component 206 is arranged to cluster labeled image elements output from the trained classifier. It uses any well-known clustering process such as k-means clustering or agglomerative clustering.

The sliding window detector 208 may be a Parzen window density estimator with an optional mean shift process. This is explained in more detail with reference to FIG. 3. In some examples non-maximal suppression is used to prevent multiple regions of interest firing for the same observed object.

Figure 6:
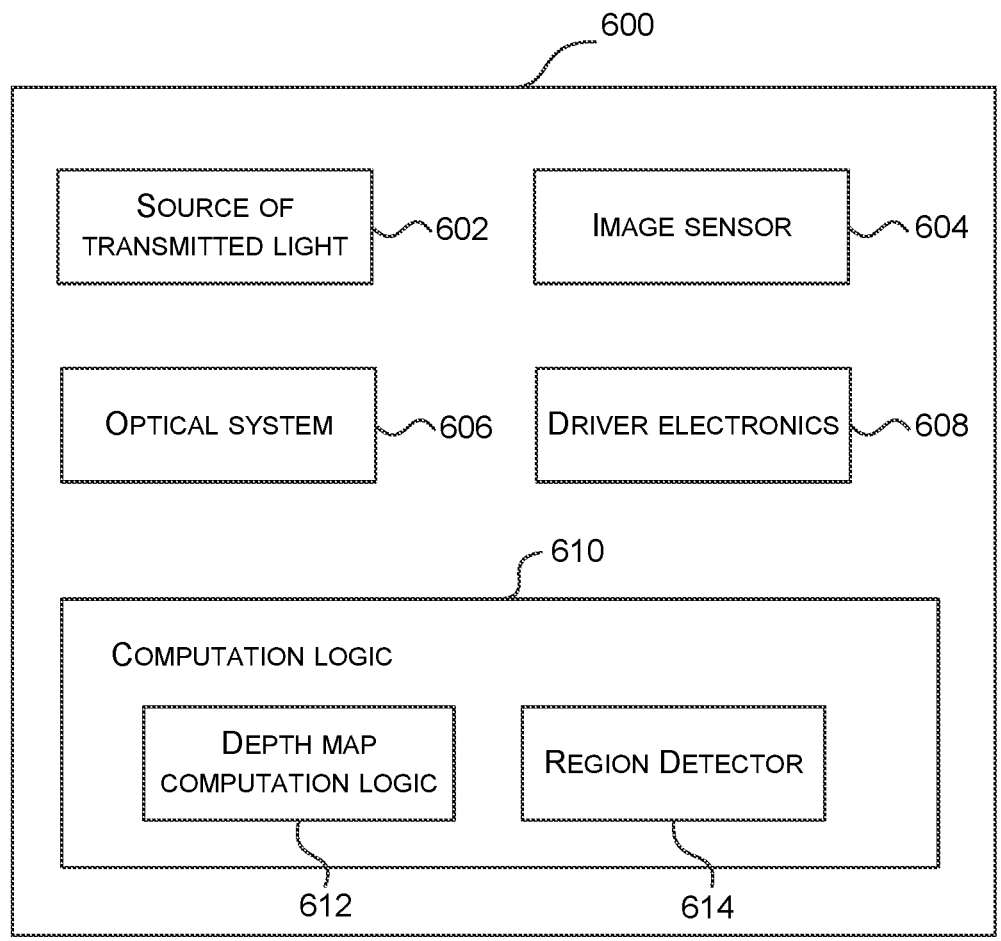
FIG. 6 is a schematic diagram of a time of flight camera.
Figure 8:
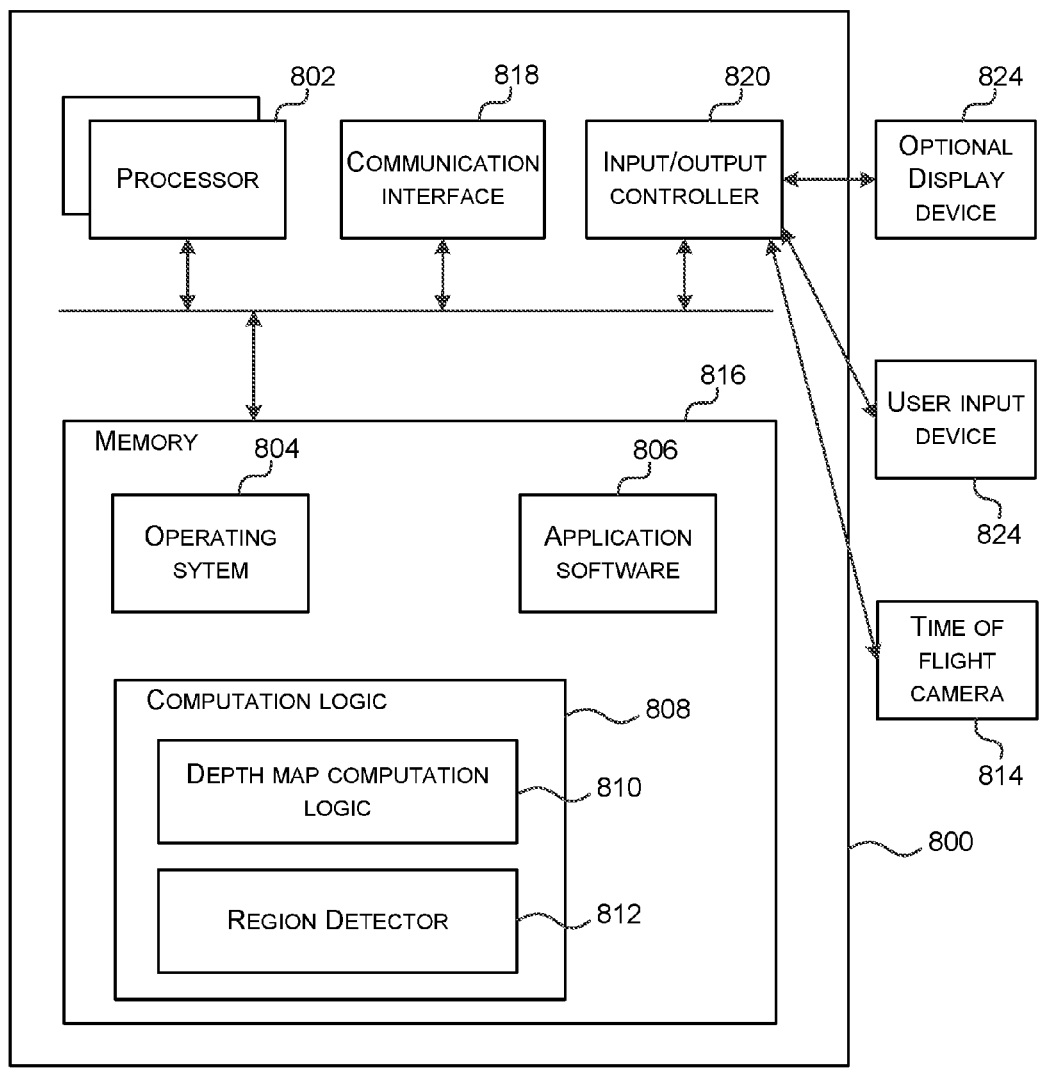
FIG. 8 illustrates an exemplary computing-based device in which embodiments of a region detector and time of flight depth computation logic may be implemented.

FIG. 3 is a flow diagram of a method at the region detector such as the region detector of FIGS. 6 and 8. Raw image data is received 300, such as time of flight image data from a time of flight camera. An individual image is processed by the trained classifier. For example, an average brightness image as described above, or one of a plurality of images from a single frame of the time of flight camera. In some examples, individual image elements (such as pixels or patches of pixels) of the raw image data are labeled 302 using a trained classifier, for example, as belonging to a region of interest or not. The labeled image elements are analyzed to detect zero, one or more regions of interest. This is done in some examples by using a well-known clustering 304 process. In some examples this is done by using a sliding window such as a Parzen window density estimator. A Parzen window density estimator (also known as a kernel density estimator) is a non-parametric process for estimating a probability density function, in this case of the image element labels. Mean shift mode detection may then be used to detect the modes in a distribution defined by the Parzen window density estimator. Mean shift mode detection is an algorithm that efficiently detects the modes (peaks) in a distribution defined by a Parzen window density estimator. Each mode is a candidate region of interest.

In some examples, rather than labeling individual image elements and then using a sliding window, it is possible to slide the window and label each window.

In some examples the region detector has one or more rules for applying 306 high level information to the analysis of the labeled image elements from the classifier. For example, the region detector may receive state data indicating that a golf game executing at a game system 128 is in a state where the player is about to tee off. The region detector may use this state data with a pre-defined rule to enable more weight to be given to candidate regions in an area of the raw image data where the player's hands are expected to be gripping a golf club. In another example, the region detector may have encoded rules or algorithms to search specified 2D area of the raw image where the user's forearm is expected to be depicted. For example a 2D cone shape. The encoded rules or algorithms may take input from another process, such as a skeleton tracker, which provides an approximate position of the region of interest. The search may then be limited to a 2D area around the approximate position where the 2D area is related to a measure of uncertainty of the approximate position.

The region detector checks whether there are any more raw images for the current frame. If there are then the process of steps 300 to 306 repeats. Where multiple raw images for a single frame have been processed, the data is aggregated 310. The region detector outputs zero, one or more candidate regions of interest 312 for the frame which has been analyzed. The process of FIG. 3 may be repeated for subsequent frames and, in some examples, regions detected in earlier frames are used to influence prediction of regions in subsequent frames.

The example above describes classifying raw signals separately and then aggregating the results of the classification before carrying out clustering. Non maximal suppression may then be applied as mentioned above.

In another example, the raw signals are aggregated prior to the classification.

It is also possible to use a classifier that has been trained to use all N raw channels as input (where a channel is a modulation frequency or an exposure period).

In some examples the trained classifier is a random decision forest. Using a random decision forest as the classifier has been found particularly effective given the need to cope with sensor noise, ambient illumination and lack of scale information. Using a random decision forest enables an extremely efficient process which may be parallelized. Where a random decision forest is used it may be trained as described with reference to FIG. 4 and may be used at test time as described with reference to FIG. 5.

Figure 4:
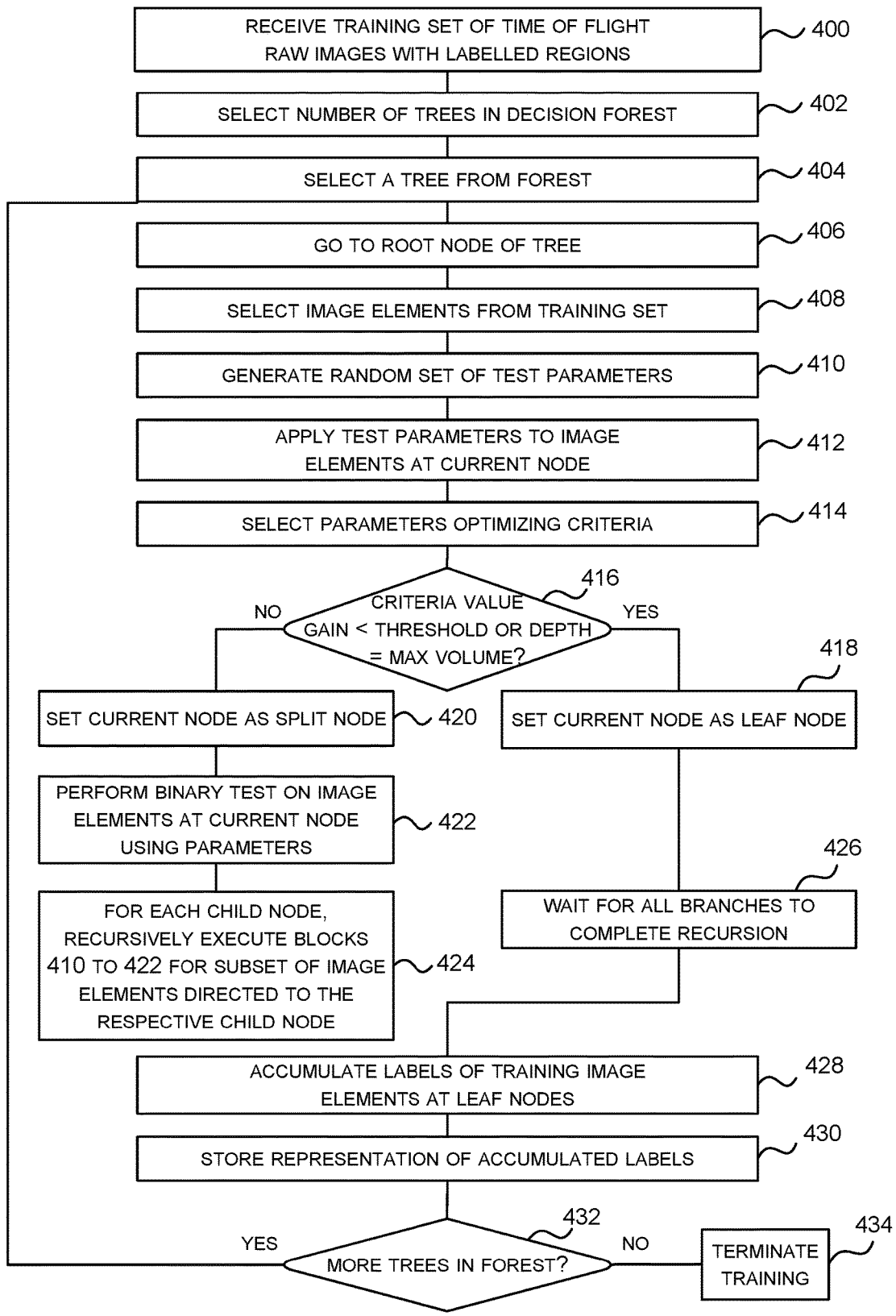
FIG. 4 is a flow diagram of a method of training a classifier for use in the region detector of FIG. 2.

Referring to FIG. 4, to train the decision forest, a training set comprising raw time of flight images with labeled regions of interest is first received 400. The number of decision trees to be used in a random decision forest is selected 402.

A decision tree from the decision forest is selected 404 (e.g. the first decision tree 400) and the root node 406 is selected 406. At least a subset of the image elements from each of the training images are then selected 408. For example, every other image element. Each selected image element of each training image is associated with a label according to whether it is a region of interest or not.

A random set of test parameters are then generated 410 for use by the binary test performed at the root node as candidate features. In one example, the binary test uses a threshold and features which compare a reference image element with one or more probe image elements offset from the reference image element by randomly selected amounts. The threshold and the offset amounts are examples of test parameters.

Then, every combination of test parameter may be applied 412 to each image element in the set of training images. In other words, available values for the offsets are tried one after the other, in combination with available values of the thresholds for each image element in each training image. For each combination, criteria (also referred to as objectives) are calculated 414. In an example, the calculated criteria comprise the information gain (also known as the relative entropy). The combination of parameters that optimize the criteria (such as maximizing the information gain is selected 414 and stored at the current node for future use. As an alternative to information gain, other criteria can be used, such as Gini entropy, or the 'two-ing' criterion or others described.

It is then determined 416 whether the value for the calculated criteria is less than (or greater than) a threshold. If the value for the calculated criteria is less than the threshold, then this indicates that further expansion of the tree does not provide significant benefit. This gives rise to asymmetrical trees which naturally stop growing when no further nodes are beneficial. In such cases, the current node is set 418 as a leaf node. Similarly, the current depth of the tree is determined (i.e. how many levels of nodes are between the root node and the current node). If this is greater than a predefined maximum value, then the current node is set 418 as a leaf node. Each leaf node has labeled time of flight image data which accumulates at that leaf node during the training process as described below.

It is also possible to use another stopping criterion in combination with those already mentioned. For example, to assess the number of example image elements that reach the leaf. If there are too few examples (compared with a threshold for example) then the process may be arranged to stop to avoid overfitting. However, it is not essential to use this stopping criterion.

If the value for the calculated criteria is greater than or equal to the threshold, and the tree depth is less than the maximum value, then the current node is set 420 as a split node. As the current node is a split node, it has child nodes, and the process then moves to training these child nodes. Each child node is trained using a subset of the training image elements at the current node. The subset of image elements sent to a child node is determined using the parameters that optimized the criteria. These parameters are used in the binary test, and the binary test performed 422 on all image elements at the current node. The image elements that pass the binary test form a first subset sent to a first child node, and the image elements that fail the binary test form a second subset sent to a second child node.

For each of the child nodes, the process as outlined in blocks 410 to 422 of FIG. 4 are recursively executed 424 for the subset of image elements directed to the respective child node. In other words, for each child node, new random test parameters are generated 410, applied 412 to the respective subset of image elements, parameters optimizing the criteria selected 414, and the type of node (split or leaf) determined 416. If it is a leaf node, then the current branch of recursion ceases. If it is a split node, binary tests are performed 422 to determine further subsets of image elements and another branch of recursion starts. Therefore, this process recursively moves through the tree, training each node until leaf nodes are reached at each branch. As leaf nodes are reached, the process waits 426 until the nodes in all branches have been trained. Note that, in other examples, the same functionality can be attained using alternative techniques to recursion.

Once all the nodes in the tree have been trained to determine the parameters for the binary test optimizing the criteria at each split node, and leaf nodes have been selected to terminate each branch, then training data may be accumulated 428 at the leaf nodes of the tree. This is the training stage and so particular image elements which reach a given leaf node have specified region of interest labels known from the ground truth training data. A representation of the training data may be stored 430 using various different methods. Optionally sampling may be used to select training data to be accumulated and stored in order to maintain a low memory footprint. For example, reservoir sampling may be used whereby a fixed maximum sized sample of training data is taken. Selection may be random or in any other manner.

Once the accumulated training data have been stored it is determined 432 whether more trees are present in the decision forest. If so, then the next tree in the decision forest is selected, and the process repeats. If all the trees in the forest have been trained, and no others remain, then the training process is complete and the process terminates 434.

Therefore, as a result of the training process, one or more decision trees are trained using synthesized or empirical training images. Each tree comprises a plurality of split nodes storing optimized test parameters, and leaf nodes storing associated labeled raw time of flight image elements or representations of aggregated labeled raw time of flight image elements. Due to the random generation of parameters from a limited subset used at each node, the trees of the forest are distinct (i.e. different) from each other.

The training process may be performed in advance of using the trained prediction system to classify image elements in a raw time of flight image. The decision forest and the optimized test parameters may be stored on a storage device for use in identifying regions of interest at a later time.

Figure 5:
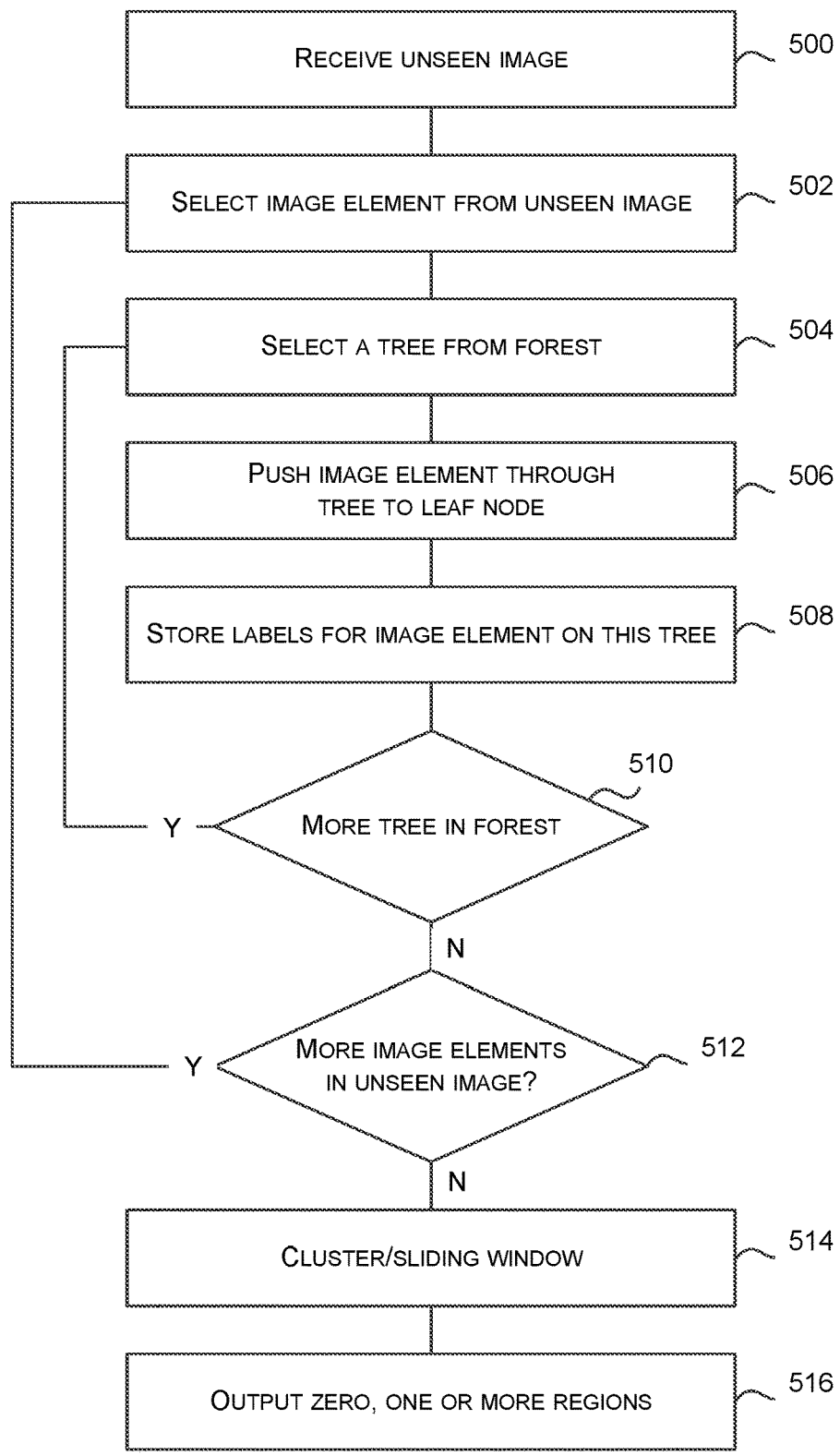
FIG. 5 is a flow diagram of a method of operating a trained classifier as part of the region detector of FIG. 2.

FIG. 5 illustrates a flowchart of a process for classifying image elements as being in a region of interest or not in a previously unseen time of flight image using a decision forest that has been trained as described with reference to FIG. 4. Firstly, an unseen time of flight image is received 500. An image is referred to as 'unseen' to distinguish it from a training image which has the regions of interest already specified. The unseen image may be a raw time of flight image, a set of raw time of flight images associated with a single frame, or one or more aggregated raw time of flight images.

An image element from the unseen image is selected 502. A trained decision tree from the decision forest is also selected 504. The selected image element is pushed 506 through the selected decision tree (in a manner similar to that described above with reference to FIG. 4), such that it is tested against the trained parameters at a node, and then passed to the appropriate child in dependence on the outcome of the test, and the process repeated until the image element reaches a leaf node. Once the image element reaches a leaf node, the accumulated labels (from the training stage) associated with this leaf node are stored 508 for this image element.

If it is determined 510 that there are more decision trees in the forest, then a new decision tree is selected 504, the image element pushed 506 through the tree and the accumulated region of interest labels stored 508. This is repeated until it has been performed for all the decision trees in the forest. Note that the process for pushing an image element through the plurality of trees in the decision forest can also be performed in parallel, instead of in sequence as shown in FIG. 5.

It is then determined 512 whether further unanalyzed image elements are present in the unseen time of flight image, and if so another image element is selected and the process repeated. Once all the image elements in the unseen image have been analyzed, then region of interest labels are obtained for all image elements.

As the image elements are pushed through the trees in the decision forest, region of interest labels accumulate. These accumulated labels are analyzed using a clustering or sliding window process 514 to find regions of interest.

Zero, one or more regions are interest are output 516 from the clustering or sliding window process.

FIG. 6 is a schematic diagram of a time of flight depth camera 600 which may be a phase modulation time of flight depth camera or a gated time of flight depth camera. The time of flight depth camera 600 comprises a source of transmitted light 602. In an example the source of transmitted light is an incoherent light source. In another example the source of transmitted light is a coherent light source. An example of an appropriate light source is a near infra-red laser or LED however another appropriate light source may be used. In the case of a phase modulated time of flight camera the transmitted light may be modulated at a modulation frequency. In an example the modulation frequency may be an RF frequency in the range kHz-GHz, for example the modulation frequency may be in the MHz range. In the case of a gated time of flight camera the transmitted light may be pulsed where the pulses may be of picosecond duration.

A time of flight depth camera may further comprise an image sensor 604 that receives light reflected from objects within the scene. The image sensor 604 may comprise a CCD sensor, a CMOS sensor, for example a Photonic Mixer Device (PMD) sensor or other appropriate sensor which may be arranged to detect light reflected from objects, people and surfaces within the camera range. In the case of a gated time of flight camera the image sensor 604 has a resolution compatible with the duration of the pulses emitted by the light source.

The camera may further comprise an optical system 606 that is arranged to gather and focus reflected light from the environment on to the image sensor 604. In an example the optical system may comprise an optical band pass filter, which may enable only light of the same wavelength as the light source to be received by the sensor. The use of an optical band pass filter may help to suppress background light. The camera may also comprise driver electronics 608 which control both the light source and an image sensor, for example, to enable highly accurate phase difference measurements to be made or to enable a train of light pulses to be emitted and for the image sensor to be "shuttered" on and off. An image sensor may be shuttered on and off electronically rather than with physical shutters.

In one example the camera may comprise computation logic 610. In an embodiment computation logic may be arranged to execute the methods described herein with reference to FIGS. 3 to 5 and 7.

Computation logic may further comprise integrated depth map computation logic 612 and region detector 614. In an example depth map computation logic 612 may be arranged to estimate a distance of an object from the difference in phase between light transmitted from the light source and the light received at the receiver.

Alternatively, or in addition, the functionality of FIG. 6 can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), Graphics Processing Units (GPUs).

Figure 7:
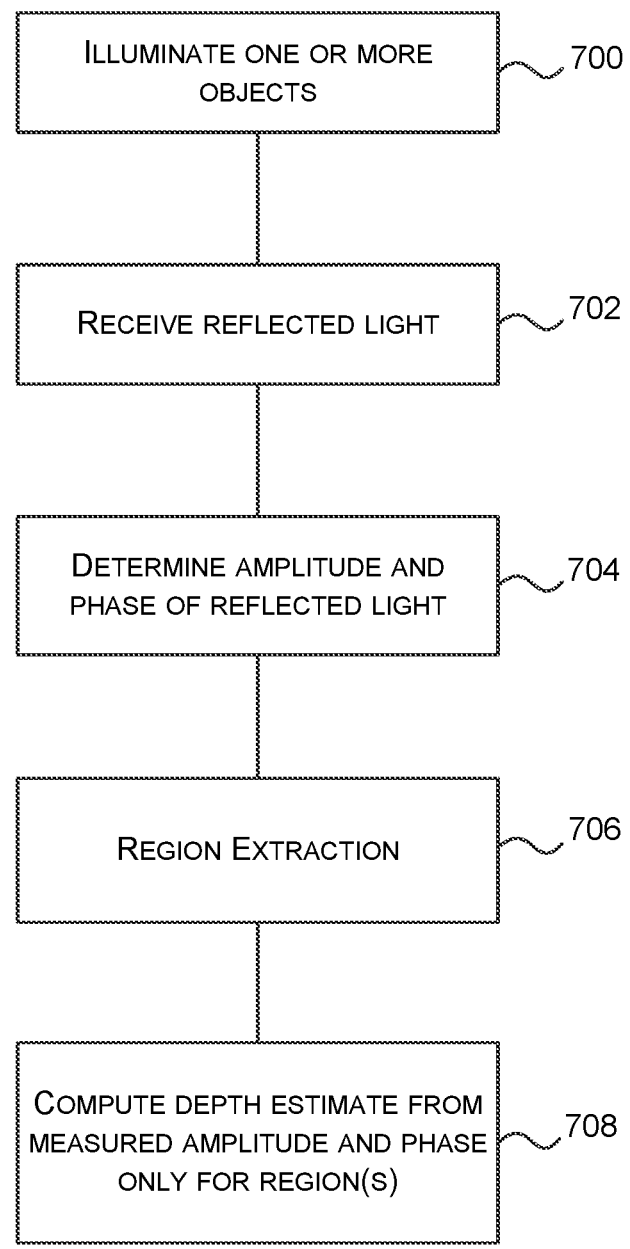
FIG. 7 is a flow diagram of a method of computing depth for use at the time of flight camera of FIG. 6.

FIG. 7 is a flow diagram of a method of operating the time of flight camera of FIG. 6. A light source at the time of flight depth camera illuminates 700 one or more nearby objects. In the case of a phase modulation time of flight camera, the light source may be a light source that is modulated at one or more frequencies. In the case of a gated time of flight camera the light source is pulsed. Light that is reflected from nearby objects is received 702. Raw sensor data is received. In the case of a phase modulation time of flight camera the raw sensor data comprises, for example, infra-red intensity images at each of a plurality of modulation frequencies is sensed. Amplitude and phase measurements are computed 704 from the intensity images.

In the case of a gated time of flight camera the raw sensor data comprises, infra-red intensity images at each of a plurality of different exposure periods. In this case step 704 is omitted.

At least part of the raw sensor data (received at step 702) for a single frame is input to a region extractor such as that of FIG. 2 and the process of FIG. 3 is followed to detect zero, one or more regions of interest 706. The raw sensor data for the regions of interest from step 702 is processed to compute 704 amplitude and phase measurements of light detected by the camera. In an example, the reflected light may be modulated at the same frequency or frequencies as the light source and the amplitude and phase of the received reflected light may be determined 704 for each modulation frequency at each pixel of a the camera at which the light is received.

In the case of a phase modulated time of flight camera, the depth map computation logic 712, 810 may be arranged to compute 708 a depth map from the measured amplitude and phase of the reflected light by computing a distance measurement for each pixel of the camera receiver. The amplitude of the light received at each pixel can be used to generate an intensity map, or 2-D image. The depth of objects from the camera may be determined from a phase shift of the reflected light relative to the transmitted light. Given that the speed of light is a known constant, the depth of an object (in meters) may be computed from the phase shift (in radians) as:

$$d = \frac{c}{2f_{mod}} \cdot \frac{\varphi}{2\pi}$$

where c in meters/second is the speed of light, $f_{mod}$ in MHz is the modulation frequency and $\varphi$ is the phase shift in radians. Therefore, an intensity and distance may be determined for each pixel of the receiver and a depth map may be generated at a resolution dependent on the resolution of the receiver i.e. a depth map generated from modulated light received at a receiver with 10000 pixels will have a higher resolution than a depth map generated from modulated light received at a receiver with 1000 pixels.

The quantity $c/(2f_{mod})$ is the maximum distance that can be measured unambiguously by the depth camera if only a single frequency is used. Therefore the one or more modulation frequencies may be selected to provide a distance measurement that is most appropriate for the application being used. In one example, where the depth camera is used with a gaming system, the one or more modulation frequencies may be selected to provide maximum unambiguous distance measurements which are approximately equivalent to the dimensions of a room. For example if the maximum unambiguous distance measurement required was in the range 4-10 meters the modulation frequencies may be selected to be in the range 15-37.5 MHz However, in another example multiple modulation frequencies may be combined to give an unambiguous measurement.

In the case of a phase modulated time of flight camera, the depth map computation logic 712, 810 may be arranged to compute a depth map from the measured intensities of the reflected light in the different exposure periods by computing a distance measurement for each pixel of the camera receiver. This is done by comparing the measured intensities with one or more models of the camera behavior obtained in a calibration phase.

FIG. 8 illustrates various components of an exemplary computing-based device 800 which may be implemented as any form of a computing and/or electronic device, and in which embodiments of region of interest detection in time of flight images may be implemented.

Computing-based device 800 comprises one or more processors 802 which may be microprocessors, controllers or any other suitable type of processors for processing computer executable instructions to control the operation of the device in order to detect regions of interest in time of flight images. In some examples, for example where a system on a chip architecture is used, the processors 802 may include one or more fixed function blocks (also referred to as accelerators) which implement a part of the method of region of interest extraction in hardware (rather than software or firmware). For example, computation logic for computing depth maps and the region detector may be implemented in hardware. Platform software comprising an operating system 804 or any other suitable platform software may be provided at the computing-based device to enable application software 806 to be executed on the device. In an example computing-based device 800 may further comprise computation logic 808. Computation logic 808 may further comprise integrated depth map computation logic 810, and region detector 812. In an example depth map computation logic 810 may be arranged to estimate a distance of an object from the difference in phase between light transmitted from the light source and the light received at the receiver.

The computer executable instructions may be provided using any computer-readable media that is accessible by computing based device 800. Computer-readable media may include, for example, computer storage media such as memory 816 and communications media. Computer storage media, such as memory 816, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media (memory 816) is shown within the computing-based device 800 it will be appreciated that the storage may be distributed or located remotely and accessed via a network or other communication link (e.g. using communication interface 808).

The computing-based device 800 also comprises an input/output controller 820 arranged to output display information to a display device 824 which may be separate from or integral to the computing-based device 800. The display information may provide a graphical user interface. The input/output controller 820 is also arranged to receive and process input from one or more devices, such as time of flight camera 814 and a user input device 822 (e.g. a mouse, keyboard, camera, microphone or other sensor). In some examples the user input device 822 may detect voice input, user gestures or other user actions and may provide a natural user interface (NUI). In an embodiment the display device 824 may also act as the user input device 822 if it is a touch sensitive display device. The input/output controller 820 may also output data to devices other than the display device, e.g. a locally connected printing device (not shown in FIG. 8).

Any of the input/output controller 820, display device 824 and the user input device 822 may comprise NUI technology which enables a user to interact with the computing-based device in a natural manner, free from artificial constraints imposed by input devices such as mice, keyboards, remote controls and the like. Examples of NUI technology that may be provided include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that may be used include intention and goal understanding systems, motion gesture detection systems using depth cameras (such as stereoscopic camera systems, infrared camera systems, RGB camera systems and combinations of these), motion gesture detection using accelerometers/gyroscopes, facial recognition, 3D displays, head, eye and gaze tracking, immersive augmented reality and virtual reality systems and technologies for sensing brain activity using electric field sensing electrodes (EEG and related methods).

In an example, a method comprises:

receiving at least one raw image captured for a single frame by a time of flight camera, the raw image depicting one or more objects in an environment of the time of flight camera;

inputting the raw image to a trained region detector and receiving in response one or more regions of interest in the raw image, a region of interest comprising image elements which are predicted to depict at least part of one of the objects; and computing depth from the one or more regions of interest of the raw image.

For example, the region detector has been trained to learn associations between image elements of raw time of flight images and regions of interest.

In examples depth is computed only from the one or more regions of interest of the raw image.

In an example the raw image from the time of flight camera is a plurality of infra-red intensity values.

The examples may comprise receiving a plurality of raw images captured for a single frame by the time of flight camera; aggregating the plurality of raw images to produce an aggregated raw image; and inputting the aggregated raw image to the trained region detector.

Examples comprise receiving a plurality of raw images captured for a single frame by the time of flight camera; and inputting each of the raw images to the trained region detector.

Examples comprise using the trained region detector to classify image elements of the raw image as being in a region of interest or not.

Examples comprise clustering the classified image elements.

Examples comprise applying a sliding window detector to the classified image elements.

Examples comprise training the region detector using training data comprising raw time of flight images depicting examples of the object, the raw time of flight images having labeled regions of interest.

In some examples the trained region detector is a random decision forest.

In an example there is a computing system comprising:

an input/output controller arranged to receive at least one raw image captured for a single frame by a time of flight camera, the raw image depicting one or more objects in an environment of the time of flight camera;

a region detector arranged to compute from the raw image one or more regions of interest in the raw image, a region of interest comprising image elements which are predicted to depict at least part of one of the objects; and a depth map computation logic 810 arranged to compute depth from the one or more regions of interest of the raw image.

For example, the computing system where the region detector comprising a classifier has been trained to learn associations between image elements of raw time of flight images and regions of interest.

The region detector may comprise a clustering component arranged to cluster labeled image elements output by the classifier.

The region detector may comprise a sliding window component arranged to compute one or more regions from labeled image elements output by the classifier.

The computing system may be integrated in a time of flight camera.

In an example, a computer readable medium stores instructions which when executed by a computing device control the device to:

receive at least one raw image captured for a single frame by a time of flight camera, the raw image depicting one or more objects in an environment of the time of flight camera;

send the raw image to a region detector, having been trained to learn associations between image elements of raw time of flight images and regions of interest, and receive in response one or more regions of interest in the raw image, a region of interest comprising image elements which are predicted to depict at least part of one of the objects; and compute depth from the one or more regions of interest of the raw image.

In an example, the computer readable medium stores instructions which when executed by a computing device control the device to: receive a plurality of raw images captured for a single frame by the time of flight camera; aggregate the plurality of raw images to produce an aggregated raw image; and input the aggregated raw image to the trained region detector.

In an example, the computer readable medium stores instructions which when executed by a computing device control the device to receive a plurality of raw images captured for a single frame by the time of flight camera; and input each of the raw images to the trained region detector.

In an example, the computer readable medium stores instructions which when executed by a computing device control the device to compute depth only from the one or more regions of interest.

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

The term 'subset' is used herein to refer to a proper subset such that a subset of a set does not comprise all the elements of the set (i.e. at least one of the elements of the set is missing from the subset).

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A method comprising:
   receiving at least one image captured for a single frame by a time of flight camera, the image depicting one or more objects in an environment of the time of flight camera;
   inputting the at least one image into a trained region detector;
   determining, by the trained region detector, one or more regions of interest in the at least one image based on associations between pixels of time of flight images and regions that depict an object of interest in the time of flight images,
   wherein a region of interest comprises image elements which are predicted to depict at least part of one of the objects; and
   computing depth from the one or more regions of interest of the at least one image.

2. The method as claimed in claim 1, wherein the single frame comprises a plurality of sensor data images.

3. The method as claimed in claim 1 comprising computing depth only from the one or more regions of interest of the at least one image.

4. The method as claimed in claim 1 wherein the at least one image from the time of flight camera is a plurality of infra-red intensity values.

5. The method as claimed in claim 1 comprising:
   receiving a plurality of images captured for a single frame by the time of flight camera;
   aggregating the plurality of images to produce an aggregated image; and
   inputting the aggregated image to the trained region detector.

6. The method as claimed in claim 1 comprising:
   receiving a plurality of images captured for a single frame by the time of flight camera; and
   inputting each of the images to the trained region detector.

7. The method as claimed in claim 1 comprising using the trained region detector to classify image elements of the at least one image as being in a region of interest or not.

8. The method as claimed in claim 7 comprising clustering the classified image elements.

9. The method as claimed in claim 7 comprising applying a sliding window detector to the classified image elements.

10. The method as claimed in claim 1 comprising training the region detector using training data comprising time of flight images depicting examples of the object, the time of flight images having labeled regions of interest.

11. The method as claimed in claim 1 wherein the trained region detector is a random decision forest.

12. A computing system comprising:
   an input/output controller arranged to receive at least one image captured for a single frame by a time of flight camera, the at least one image depicting one or more objects in an environment of the time of flight camera;
   a region detector arranged to compute from the at least one image one or more regions of interest in the at least one image based on associations between pixels of time of flight images and regions that depict an object of interest in the time of flight images, a region of interest comprising image elements which are predicted to depict at least part of one of the objects; and a depth map computation logic arranged to compute depth from the one or more regions of interest of the at least one image.

13. The computing system of claim 12, wherein the single frame comprises a plurality of sensor data images.

14. The computing system of claim 13 the region detector comprising a clustering component arranged to cluster labeled image elements output by the classifier.

15. The computing system of claim 13 the region detector comprising a sliding window component arranged to compute one or more regions from labeled image elements output by the classifier.

16. The computing system of claim 13 integrated in a time of flight camera.

17. A computer storage media storing instructions which when executed by a computing device control the device to:
receive at least one image captured for a single frame by a time of flight camera, the at least one image depicting one or more objects in an environment of the time of flight camera;
send the at least one image to a region detector, having been trained to learn associations between image elements of time of flight images and regions of interest;
determine, by the trained region detector, one or more regions of interest in the at least one image based on associations between pixels of time of flight images and regions that depict an object of interest in the time of flight images, a region of interest comprising image elements which are predicted to depict at least part of one of the objects; and
computer depth from the one or more regions of interest of the at least one image.

18. The computer readable medium of claim 17 storing instructions which when executed by a computing device control the device to: receive a plurality of images captured for a single frame by the time of flight camera; aggregate the plurality of images to produce an aggregated image; and input the aggregated image to the region detector.

19. The computer readable medium of claim 17 storing instructions which when executed by a computing device control the device to receive a plurality of images captured for a single frame by the time of flight camera; and input each of the plurality of images to the region detector.

20. The computer readable medium of claim 17 storing instructions which when executed by a computing device control the device to compute depth only from the one or more regions of interest.

* * * * *